United States Patent [19]

Araki

[11] Patent Number: 5,068,743
[45] Date of Patent: Nov. 26, 1991

[54] FACSIMILE RECORDING APPARATUS WITH PAGE CUTTING OR CONTINUOUS FEED MODE DEPENDING ON MODE SETTING OR ON NUMBER OF PAGES TO BE RECEIVED

[75] Inventor: Shigeharu Araki, Ikoma, Japan

[73] Assignee: Sharp Kabushiki Kaisha, Osaka, Japan

[21] Appl. No.: 494,223

[22] Filed: Mar. 15, 1990

[30] Foreign Application Priority Data

Mar. 17, 1989 [JP] Japan .................................. 1-66739
Mar. 17, 1989 [JP] Japan .................................. 1-66740
Mar. 17, 1989 [JP] Japan .................................. 1-66741

[51] Int. Cl.⁵ .......................... H04N 1/23; B41J 11/66
[52] U.S. Cl. ...................................... 358/304; 346/24
[58] Field of Search ............... 358/304, 449; 346/24; 355/310, 28, 29; 400/621, 621.1, 621.2

[56] References Cited

U.S. PATENT DOCUMENTS 3,597,076  8/1971  Hubbard .......................... 355/310
4,941,377  7/1990  Ishihara ........................... 355/310
4,957,381  9/1990  Sakai ................................ 400/621

FOREIGN PATENT DOCUMENTS 56-60163   5/1981  Japan .
61-270970  12/1986  Japan .

Primary Examiner—Benjamin R. Fuller
Assistant Examiner—Scott A. Rogers
Attorney, Agent, or Firm—David G. Conlin; Robert F. O'Connell

[57] ABSTRACT

A facsimile apparatus including: a mode setting unit for setting one of a cut-off mode in which a recording paper on which received image data is recorded is cut off page by page and discharged, and a continuous mode in which the recording paper is continuously discharged without being cut off, a cut-off control unit for generating a cut-off signal on receipt of a signal indicating that a transmission of image data for one page is completed and a signal indicating that a transmission of the whole image data is completed in a state where the cut-off mode is set, and a cut-off unit for cutting off the recording paper in response to the cut-off signal.

4 Claims, 7 Drawing Sheets

Fig. 9
Fig. 10
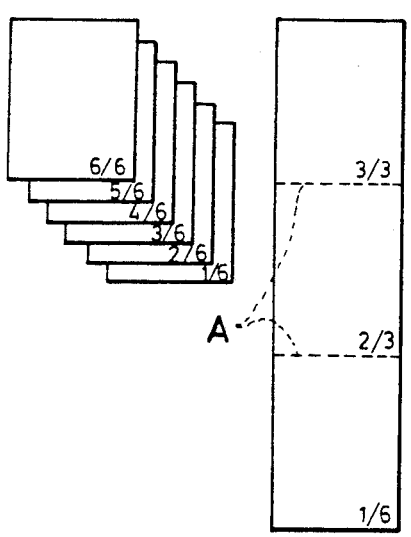
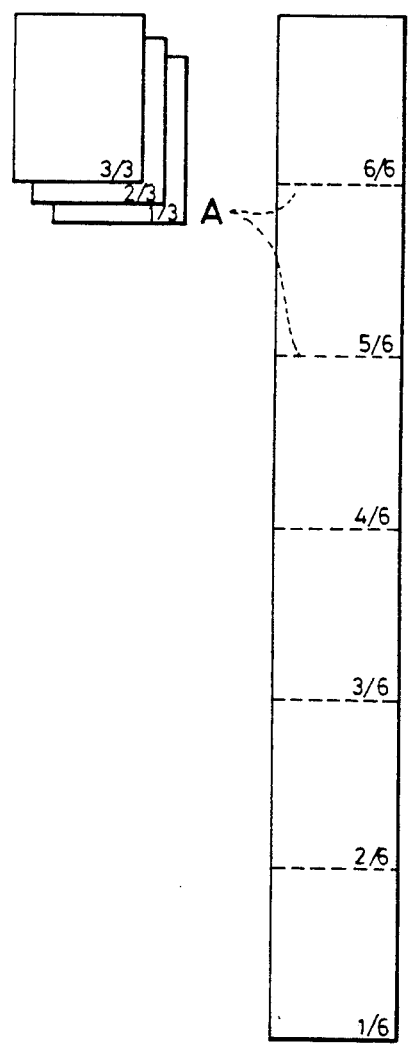

FACSIMILE RECORDING APPARATUS WITH PAGE CUTTING OR CONTINUOUS FEED MODE DEPENDING ON MODE SETTING OR ON NUMBER OF PAGES TO BE RECEIVED

BACKGROUND OF THE INVENTION

1. Field of the Invention

The present invention relates to a facsimile apparatus which can be used as either a desk-top type or a wall-mount type, and a facsimile apparatus which has the function of automatically cutting off a recording paper on which received image data is recorded.

2. Description of the Related Art

In recent years, a facsimile apparatus which can be used as either a desk-top type or a wall-mount type has been developed. This kind of facsimile apparatus is designed attaching importance to one of being placed on a desk and being mounted on a wall.

Such a facsimile apparatus which is basically designed to be placed on a desk has a cutter for cutting off a recording paper page by page. The recording paper cut off by the cutter is discharged to a stacker (discharge tray).

On the other hand, in such a facsimile apparatus which is basically designed to be mounted on a wall, a recording paper on which received image data is recorded is discharged by its own weight. In the wall-mount type facsimile apparatus, a so-called jam rarely occurs, and, therefore, a cutter is not provided on account of that the papers discharged would scatter if the recording paper is cut off page by page. Accordingly, the recording paper on which received image data is recorded is discharged continuously without being cut off.

In a case where the above-mentioned facsimile apparatus basically designed to be placed on a desk is used as the wall-mount type facsimile apparatus, since a recording paper on which received image data is recorded is cut off page by page, a special stacker must be provided to prevent the discharged papers from falling and scattering. On the other hand, in a case where the facsimile apparatus basically designed to be mounted on a wall is used as the desk-top type facsimile apparatus, since a cutter is not provided, a recording paper on which received image data is recorded is not cut off and instead is discharged continuously. Therefore, it is required to cut off the discharged paper after every facsimile reception, and further, a so-called jam is likely to occur.

As described above, such conventional facsimile apparatus capable of being used as both the desk-top type and the wall-mount type has drawbacks that it requires a special stacker or jam is likely to occur.

In another conventional facsimile apparatus having a function of automatically cutting off a recording paper on which received image data is recorded, a cutter is driven to cut off the recording paper each time image data for one page is received and recorded, and the paper which has been cut off page by page is discharged to a stacker (discharge tray) page by page. However, in such a facsimile apparatus having the function of automatically cutting off the recording paper, discharged papers are piled on one after the other, and therefore piled recording papers must be sorted for each destination at the receiving side, which requires laborious work.

In order to cope with this problem, in Japanese Patent Publication No. 61-95662 is disclosed a facsimile apparatus capable of selecting either a page-by-page mode in which a recording paper is cut off page by page or a continuous mode in which the recording paper is cut off each time one communication is terminated.

When the number of pages of a manuscript to be facsimiled in one communication is relatively small, e.g., two or three pages, if the continuous mode is selected, recording paper is discharged without being cut off, thereby reducing the sorting work. However, when the manuscript having many pages is received in the continuous mode, there arise such problems that the discharged paper overflows from a stacker, the jam occurs at a discharging outlet, and handling the discharged paper is hard because it is too long.

The first object of the present invention is to provide a facsimile apparatus capable of cutting off a recording paper page by page on which received image data is recorded when it is used as the desk-top type, and capable of continuously discharging the recording paper without cutting it off when it is used as the wall-mount type.

The second object of the present invention is to provide a facsimile apparatus capable of cutting off a recording paper depending on the number of sheets of a manuscript to be facsimiled.

The first object of the present invention can be achieved by a facsimile apparatus including:

mode setting means for setting one of a cut off mode in which a recording paper on which received image data is recorded is cut off page by page and discharged, and a continuous mode in which the recording paper is continuously discharged without being cut off;

cut-off control means for generating a cut-off signal on receipt of a signal indicating that a transmission of image data for one page is completed and a signal indicating that a transmission of the whole image data is completed in a state where said cut-off mode is set; and cut-off means for cutting-off the recording paper in response to said cut-off signal.

According to the above-mentioned facsimile apparatus, the problems which occur in the above-mentioned conventional facsimile apparatus which is capable of being used as both the desk-top type and the wall-mount type, that is, occurrence of jam and scattering of the discharged recording papers can be eliminated.

The second object of the invention can be achieved by a facsimile apparatus including:

cut-off mode selection means for selecting one of the first cut off mode in which a recording paper on which received image data of a manuscript is recorded is cut off page by page and discharged, and the second cut-off mode in which the recording paper is cut off page by page and discharged or the recording paper is cut off after the completion of reception of the whole image data of the manuscript depending on the number of pages of the manuscript;

comparison means for comparing data indicative of the number of pages of the manuscript sent prior to transmission of image data with data indicative of a predetermined number of pages; and cut off means for cutting-off the recording paper on receipt of a signal indicating that transmission of image data for one page of the manuscript is completed and a signal indicating that transmission of the whole image data of the manuscript is completed in a state where said first cut-off mode is selected and in a state where said second cut-off mode is selected and it is detected that the number of pages of the manuscript is more (or smaller) than the predetermined number of pages by said comparison means and for cutting-off the recording paper on receipt of the signal indicating that transmission of the whole image data is completed in a state where said second cut-off mode is selected and it is detected that the number of pages of the manuscript is smaller (or more) than the predetermined number of pages by said comparison means.

With the above-mentioned facsimile apparatus, the overflow of a discharged long recording paper from a stacker and jam can be prevented by setting, for example, the facsimile apparatus to continuously discharge the recording paper without being cut off if the number of pages of a manuscripts to be facsimiled in one communication is small, and to cut off the recording paper page by page if the number of pages of the manuscript.

In a situation in which there is no possibility that the recording paper will overflow from a stacker and jam even if it is long, the facsimile apparatus may be set such that the recording paper is cut off page by page when the number of pages of the manuscript is small, and the recording paper is continuously discharged without being cut off when the number of pages of the manuscript is large until the last page of the manuscript is discharged.

Further objects and advantages of the present invention will be apparent from the following description, reference being had to the accompanying drawings wherein preferred embodiments of the present invention are clearly shown.

BRIEF DESCRIPTION OF THE DRAWINGS

FIGS. 9 and 10 are views illustrating the recording papers discharged from the facsimile apparatus of the second embodiment.

DETAILED DESCRIPTION OF THE PREFERRED EMBODIMENTS

The first embodiment of the present invention will be described in detail hereinafter with reference to the accompanying drawings.

Figure 1:
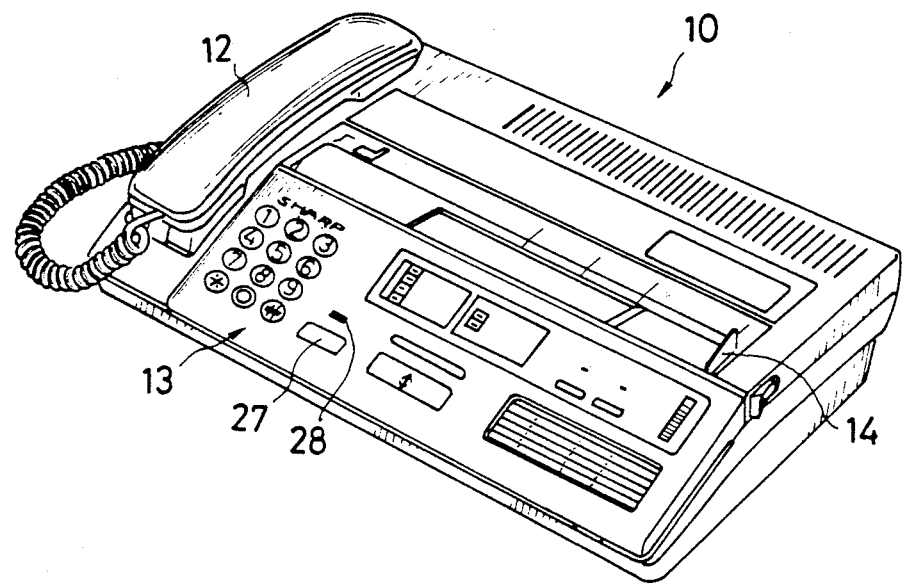
FIG. 1 is a perspective view of a facsimile apparatus of the first embodiment of the present invention.
Figure 2:
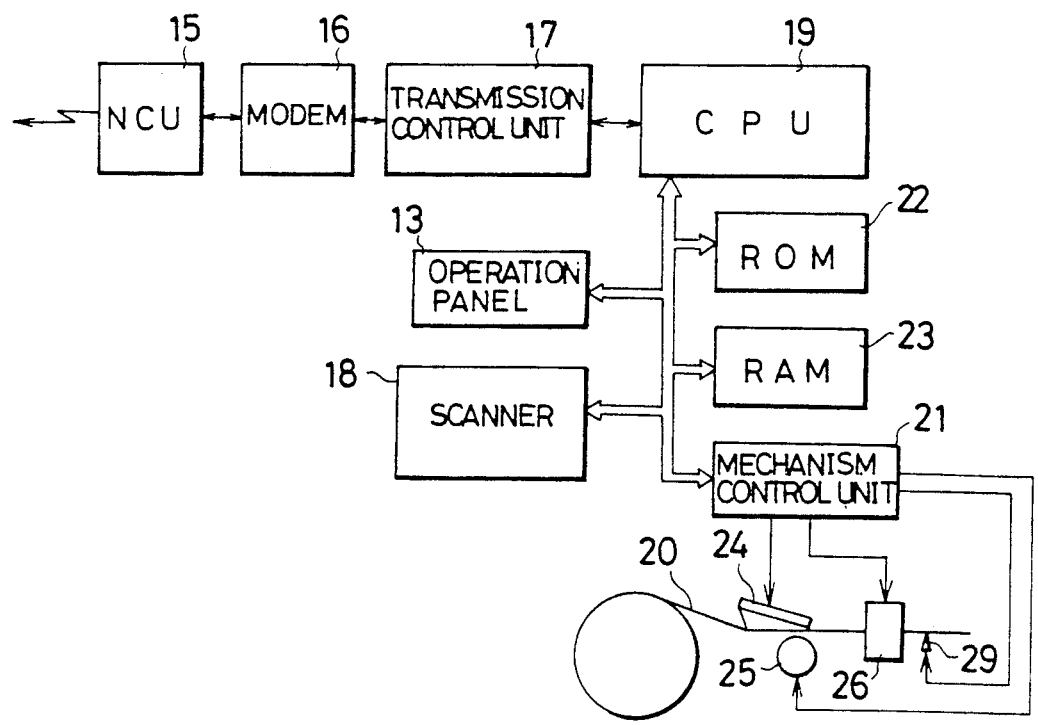
FIG. 2 is a block diagram of the facsimile apparatus of the first embodiment.

FIG. 1 is a perspective view of a facsimile apparatus 10 of one embodiment of the present invention. FIG. 2 is a block diagram of the facsimile apparatus 10.

In FIG. 1, there are shown a handset 12 used to make an ordinary call by dialling, an operation panel 13 having various kinds of operation keys and displays, and a manuscript width adjustment guide 14.

As shown in FIG. 2, this facsimile apparatus 10 comprises a network control unit (NCU) 15 for controlling input and output from and to the line, a modem 16 (modulation/demodulation unit) for modulating or demodulating image data, a transmission control unit 17 for controlling transmission in accordance with communication protocols, a scanner 18 for reading a manuscript to be facsimiled, the above-mentioned operation panel 13, a central control unit (CPU) 19 for controlling the entire apparatus, a mechanism control unit 21 for controlling each mechanism for recording image data on a recording paper 20 and cutting-off the recording paper 20 or the like, a ROM 22 in which control programs are stored, a RAM 23, a thermal head 24 and a roller platen 25 for printing image data on the recording paper 20, and a cutter 26 for cutting-off the recording paper 20.

In the facsimile apparatus 10 of this embodiment, either of the following modes: (a) a cut-off mode in which the recording paper 20 is cut off page by page; and (b) a continuous mode in which the recording paper 20 is continuously discharged without being cut off; can be selected depending on whether the facsimile apparatus is used as the desk-top type or the wall-mount type. This facsimile apparatus is designed to cut off the recording paper 20 on which received image data is recorded by key operation if the continuous mode is selected after the completion of reception. Further, this apparatus is designed as mentioned below to be capable of performing mode selection and cutting-off the recording paper 20 by operating a single key.

That is, as shown in FIG. 1, the operation panel 13 is provided with a mode selection/cut key 27 which functions as a mode selection key and as a cut key, and a mode setting lamp 28 which turns on when the continuous mode is set by this key 27. The operation panel 13 is also provided with a sensor 29 as a remaining recording paper detection means comprising an optical sensor and a microswitch for detecting the presence of a recording paper on which received image data is recorded and which is not yet cut off, i.e., the remaining recording paper.

For performing mode selection and cutting-off the recording paper 20 after the completion of reception by the single key 27, the facsimile apparatus of this embodiment is adapted to perform the following control according to the mode and the presence or absence of the remaining recording paper indicated by the sensor 29 when the above-mentioned key 27 is operated.

That is, when the key 27 is operated, the cut-off mode is released and the continuous mode is set up instead, if the cut mode has already been set assuming that it is operated to select a mode rather than cut off the recording paper 20 since the recording paper 20 must have been cut off page by page and there is no remaining recording paper. In a case where the continuous mode has already been set, when the key 27 is operated, the remaining recording paper is cut off by the cutter 26, assuming that the key is operated as a cut key if the presence of the remaining recording paper is detected by the sensor 29. In the above case, if no remaining recording paper is detected, the continuous mode is released and the cut-off mode is set, assuming that the key is operated to select a mode rather than cut off the remaining recording paper.

In order to perform the control described above, the central control unit 19 of the facsimile apparatus 10, the ROM 22 and the RAM 23 function as an output means which outputs a mode selection signal for selecting either the cut-off mode or the continuous mode on the basis of the output from the sensor 29 in response to the operation of the mode selection/cut key 27, and further function as a cutter control means which controls the driving of the cutter 26 through the mechanism control unit 21.

In response to the key operation of the mode selection/cut key 27, this output means outputs a mode selection signal for selecting the continuous mode when the cut-off mode has been already set, outputs a mode selection signal for selecting the cut-off mode when the continuous mode has been already set and there is no remaining recording paper, and outputs a cut signal for cutting-off the remaining recording paper when the continuous mode has been already set and there is remaining recording paper to the cutter control means.

The cutter control means, which is supplied with the mode selection signal and the cut signal from the output means, cuts off the recording paper 20 on which received image data is recorded by driving the cutter 26 in response to a signal indicative of the transmission for one-page data being completed and a signal indicative of the transmission of the whole data being completed in the cut-off mode. In the continuous mode, the cutter control means stops the driving of the cutter 26, and cuts off the recording paper 20 by driving the cutter 26 only when a cut signal is supplied.

The operation of this facsimile apparatus will now be explained in detail with reference to the flowcharts of FIGS. 3 and 4.

Figure 3:
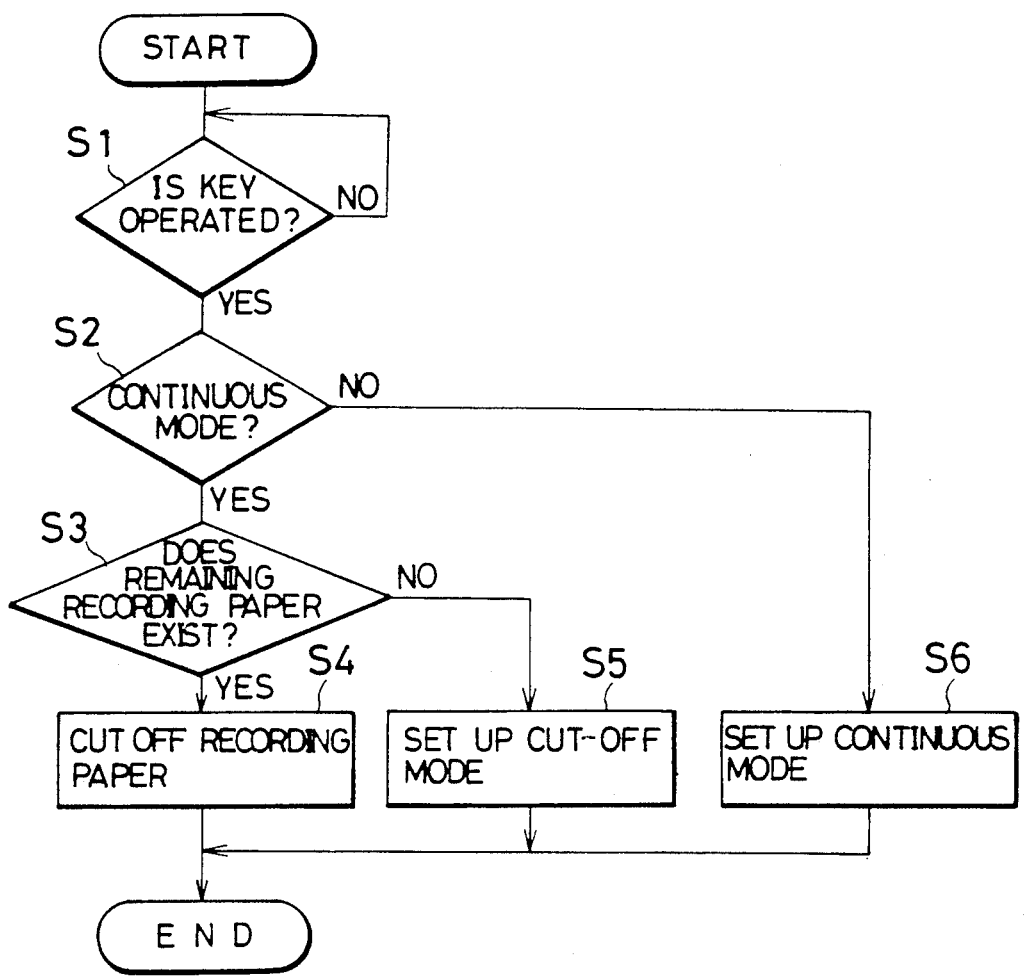
FIGS. 3 and 4 are flowcharts for explaining the operation of the facsimile apparatus of the first embodiment.

FIG. 3 shows the operation of the apparatus when the mode selection/cut key 27 is operated.

In step S1, it is determined whether or not the mode selection/cut key 27 has been operated. When this key is operated, it is determined whether or not the apparatus is in the continuous mode. When it is in the continuous mode, it is determined whether or not there is a remaining recording paper in step S3. When there is a remaining recording paper, the remaining recording paper is cut off in step S4, and the operation is completed.

When it is determined that there is no remaining recording paper in step S3, the continuous mode is released and the cut-off mode is set in step S5, completing the operation. When it is determined that it is not in the continuous mode, that is, it is in the cut-off mode in step S2, the cut-off mode is released and the continuous mode is set in step S6, completing the operation.

Figure 4:
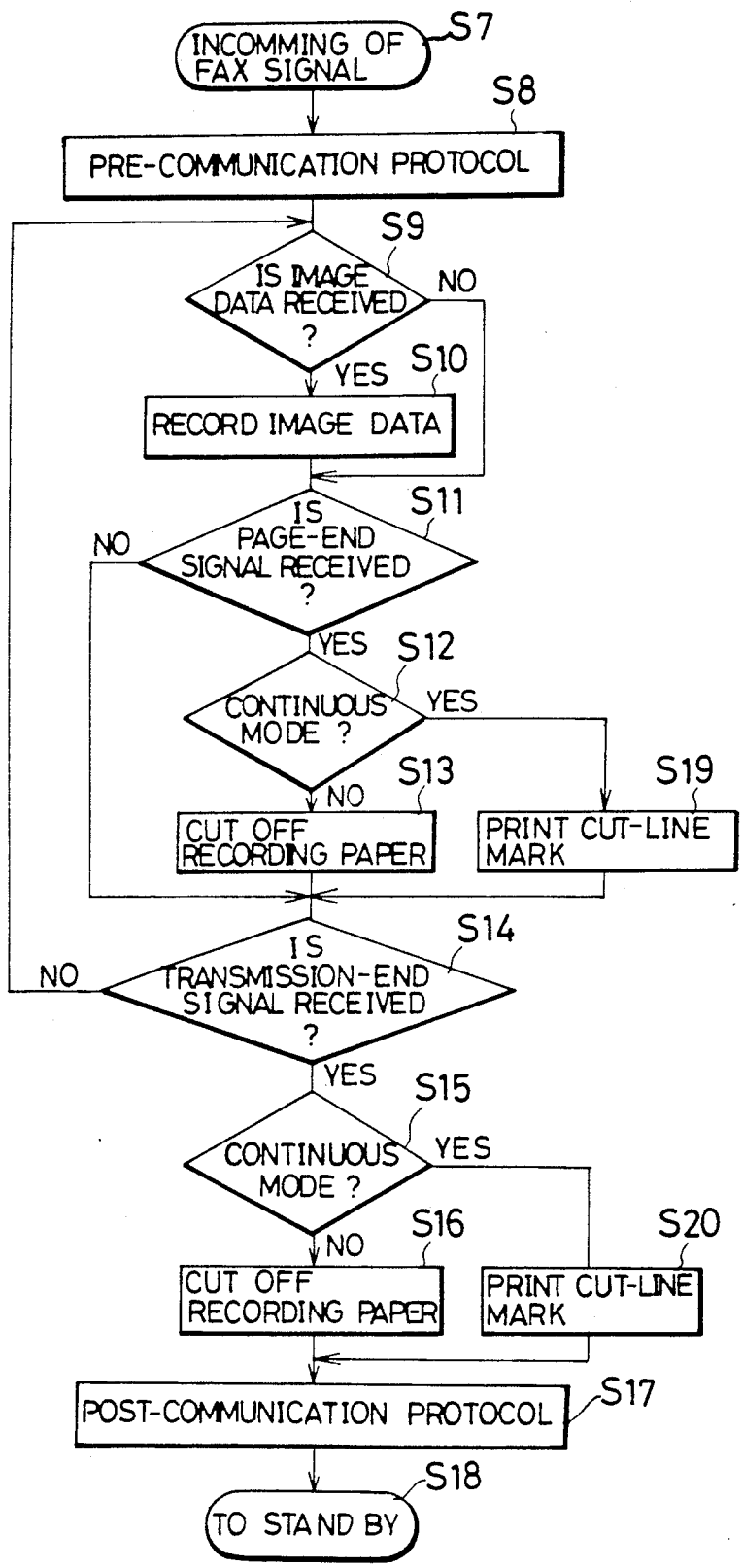

FIG. 4 shows the operation of the apparatus on receipt of image data via the line in the cut-off mode or the continuous mode.

First, when an incoming of facsimile signal is detected in step S7, the line is connected and the pre-communication protocol according to the recommendation of CCITT (International Telegraph and Telephone Consultative Committee) is communicated with the other party, and the operation proceeds to step S9.

In step S9, it is determined whether or not image data has been received. When it is received, the image data is recorded on the recording paper 20 in step S10, and the operation proceeds to step S11. In step S11, it is determined whether or not a PAGE-END signal indicating that the transmission for one-page data is completed has been received. When this PAGE-END signal is received, it is determined whether or not the apparatus is in the continuous mode in step S12. When it is determined that it is in the continuous mode, a cut-line mark is printed on the recording paper 20 page by page in step S19, and the operation proceeds to step S14. When it is determined in step S12 that it is not in the continuous mode, i.e., it is in the cut-off mode, the recording paper 20 is cut off in step S13, and the operation proceeds to step S14.

In step S14, it is determined whether or not a TRANSMISSION-END signal indicating that the transmission of the whole data is completed has been received. If this signal is not received, the operation returns to step S9. If it is received, it is determined whether or not the apparatus is in the continuous mode in step S15. When it is determined that the apparatus is in the continuous mode, the cut-line mark is printed on the recording paper 20 page by page in step S20, and the operation proceeds to step S17. When it is determined that it is not in the continuous mode, i.e., it is in the cut-off mode in step S15, the recording paper 20 is cut off in step S16, and the operation proceeds to step S17.

In step S17, after completing the pre-communication protocol according to the recommendation of CCITT, the line is disconnected, and the operation proceeds to step S18 where the facsimile apparatus is placed in a stand-by state.

Figure 5:
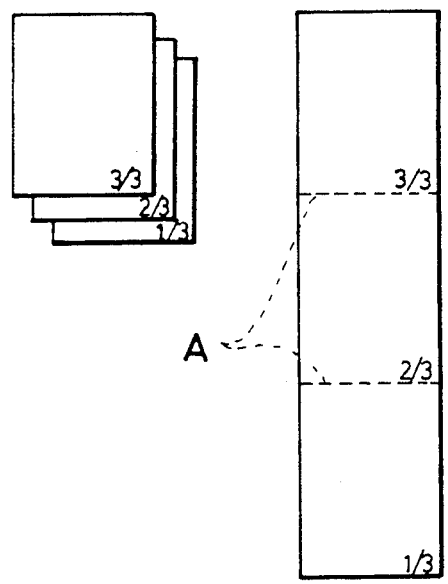
FIG. 5 is a view illustrating the recording papers discharged from the facsimile apparatus of the first embodiment.

The left side of FIG. 5 shows the recording paper 20 which has been cut off page by page and discharged in the cut-off mode. The right side of FIG. 5 shows the recording paper 20 which has been printed with cut-line marks A and discharged continuously in the continuous mode. When the mode selection/cut key 27 is operated, the recording paper 20 shown in the right side of FIG. 5 is cut off.

As mentioned above, either of the following modes can be selected: (a) the cut-off mode in which the recording paper 20 on which received image data is recorded is cut off page by page by the cutter 26; and (b) the continuous mode in which the recording paper 20 is discharged without being cut off. Therefore, when the facsimile apparatus is used as the desk-top type, the recording paper 20 can be cut off page by page by selecting the cut-off mode, while, when it is used as the wall-mount type, the recording paper 20 can be discharged continuously without being cut off by selecting the continuous mode.

Further, in the continuous mode, the recording paper 20 can be cut off by operating the key 27 after the reception is completed. In addition, mode selection and the cutting of the recording paper 20 can be performed by the operation of the single key 17, and therefore the operation becomes easy compared to a case where individual keys are provided.

The second embodiment of the present invention will now be described.

Figure 6:
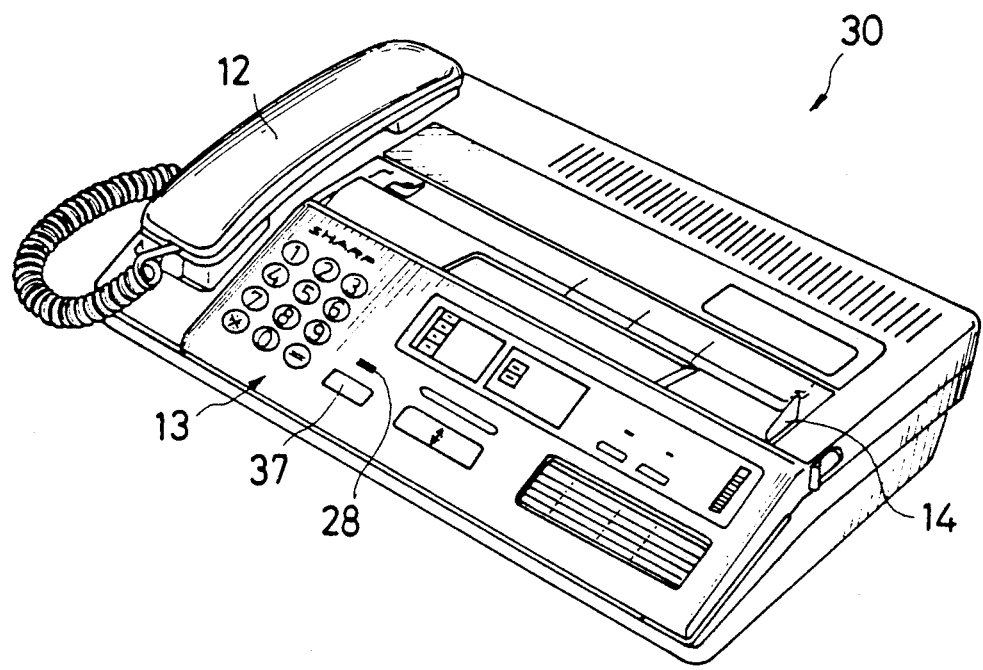
FIG. 6 is a perspective view of the facsimile apparatus of the second embodiment of the present invention.
Figure 7:
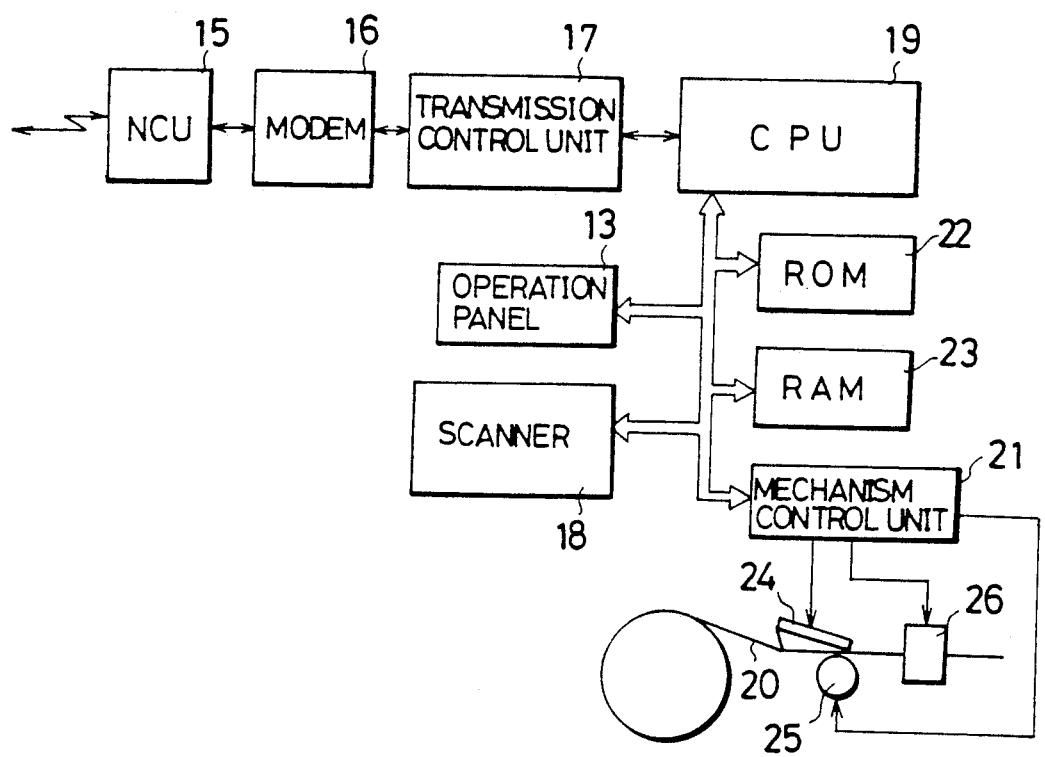
FIG. 7 is a block diagram of the facsimile apparatus of the second embodiment.

FIG. 6 is a perspective view of a facsimile apparatus 30 of the second embodiment of the present invention. FIG. 7 is a block diagram of the apparatus of FIG. 6.

The same units as those in FIGS. 1 and 2 mentioned above are given the same reference numerals, and further explanations are not given.

The facsimile apparatus 30 of this second embodiment is designed to make it possible to select either the first cut-off mode in which the recording paper 20 is cut off page by page by the cutter 26, or the second cut-off mode in which the recording paper 20 is cut off page by page or each time one communication is terminated according to the number of pages of a manuscript to be facsimiled in one communication.

Accordingly, as shown in FIG. 6, the operation panel 13 is provided with a cut off mode selection key 37 and a mode setting lamp 28 which turns on when the key 37 is operated to select the second cut-off mode.

In addition, the central control unit 19, the ROM 22 and the RAM 23 of the facsimile apparatus 30 can function as a comparison means for comparing data indicating the number of pages of a manuscript to be facsimiled sent from the transmission side prior to the transmission of image data with data indicating the predetermined number of a manuscript, and as a cutter control means for cutting-off the recording paper 20 page by page with the cutter 26 through the mechanism control unit 21 if the number of the pages of the manuscript to be facsimiled is greater than the predetermined number and cutting-off the recording paper 20 with the cutter 26 through the mechanism control unit 21 each time one communication is terminated if the number of the pages of the manuscript is smaller than the predetermined number.

When an incoming of facsimile signal is detected in a case where the cut-off mode selection key 37 has been operated to select the second cut-off mode, the facsimile apparatus of the second embodiment cuts off the recording paper 20 each time the signal indicating that the transmission for one-page data is completed is received, that is, cuts off the recording paper 20 page by page, if the number of the pages of the manuscript to be facsimiled is greater than the predetermined number. If the number of the pages of the manuscript is smaller than the predetermined number, the recording paper 20 is cut off in response to the reception of a signal indicating that the transmission of the whole data is completed, that is, it is cut off for each communication.

The predetermined number of pages to be preset can be registered through the operation of keys on the operation panel 3 taking the capacity of the stacker into consideration.

Figure 8:
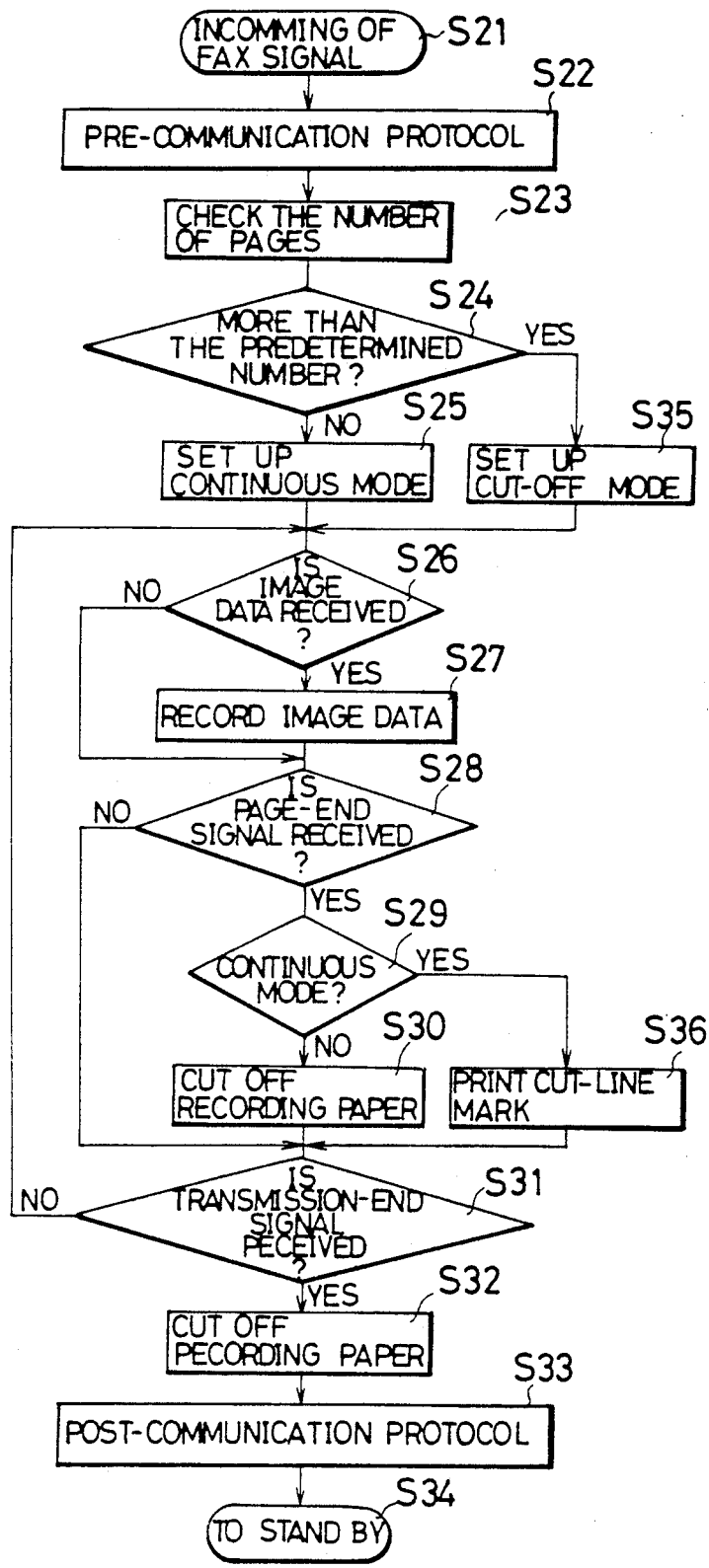
FIG. 8 is a flowchart for explaining the operation of the facsimile apparatus of the second embodiment.

The operation of the facsimile apparatus in the second cut-off mode will now be described in detail with reference to the flowchart of FIG. 8.

First, when an incoming of facsimile signal is detected in step S21, the line is connected automatically and the pre-communication protocol according to the recommendation of CCITT is communicated with the other party, and the operation proceeds to step S23.

In step S23, the number of pages of a manuscript to be facsimiled sent from the transmission side prior to the transmission of image data is checked, and the operation proceeds to step S24. In step S24, the number of pages of the manuscript to be received is compared with the predetermined number to determine whether or not the number of the pages of the manuscript is greater than the predetermined number. If it is greater than the predetermined number, the cut-off mode in which the recording paper is cut off page by page is set in step S35, and the operation proceeds to step S26. If it is smaller than the predetermined number, the continuous mode in which the recording paper is cut off for each communication is set in step S25, and the operation proceeds to step S26.

In step S26, it is determined whether or not image data has been received. When the picture image data is received, it is recorded on the recording paper 20 in step S27, and the operation proceeds to step S28. In step S28, it is determined whether or not the PAGE-END signal indicating that the transmission for one-page is completed has been received. When this signal is received, it is determined whether or not the apparatus is in continuous mode in step S29. When it is determined that the apparatus is in the continuous mode, the cut-line mark is printed on the recording paper 20 page by page in step S36, and the operation proceeds to step S31. When it is determined in step S29 that the apparatus is not in the continuous mode but in the cut-off mode, the recording paper 20 is cut off page by page in step S30, and the operation proceeds to step S31.

In step S31, it is determined whether or not the TRANSMISSION-END signal indicating that the transmission of the whole data is completed has been received. If this signal is not received, the operation returns to step S26. If this signal is received, the recording paper 20 is cut off in step S32, and the post-communication protocol according to the recommendation of CCITT is completed in step S33, then the line is disconnected and the operation proceeds to step S34 where the facsimile apparatus is placed in the stand-by state.

FIG. 9 is a view illustrating the recording paper 20 in a case where the predetermined number of pages is four. When a manuscript having six pages is facsimiled, the recording paper is cut off page by page, as shown on the left side of FIG. 9. When a manuscript having three pages is facsimiled, as shown on the right side of FIG. 9, cut-line marks A are printed page by page, and the recording paper is cut off after it has been discharged continuously for three pages. Therefore, the overflow of the discharged long recording paper from the stacker and the jam at the paper discharging outlet can be prevented. Further, it is possible to prevent the recording paper from becoming too long, which is troublesome for the user to handle.

In the first cut-off mode, the recording paper is cut off page by page in the same way as a conventional facsimile apparatus irrespective of the number of pages of a manuscript to be facsimiled.

In a situation where there is no possibility of the discharged recording paper overflowing from the stacker and jamming even if it is long, the recording paper may be cut off page by page when the number of pages of a manuscript is small, and it may be discharged continuously and cut off after the communication is terminated when the number of the pages is great. In this case, step S24 of the flowchart of FIG. 8 is changed in order that the operation proceeds to step S25 when the number of pages of a manuscript to be facsimiled is greater than the predetermined number and proceeds to step S35 when the number of the pages of the manuscript is smaller than the predetermined number.

FIG. 10 shows the discharged recording papers 20 in a case where the predetermined number is four and the step S24 is changed as mentioned above. When a manuscript having three pages is facsimiled, the recording paper is cut off page by page as shown on the left side of FIG. 10. When a manuscript having six pages is facsimiled, the cut-line marks A are printed on each page as shown on the right side in FIG. 10, and the recording paper is cut off when the last page is discharged.

Many widely different embodiments of the present invention may be constructed without departing from the spirit and scope of the present invention. It should be understood that the present invention is not limited to the specific embodiments described in this specification, except as defined in the appended claims.

What is claimed is:

1. A facsimile apparatus, comprising:
  network control means for controlling a transmission and reception of image data through a signal line in communication with another facsimile apparatus;

mode setting means for setting a mode of operation of said facsimile apparatus either in a cut-off mode, in which a recording paper on which received image data is being recording is to be cut off page by page and discharged, or in a continuous mode, in which the recording paper is to be continuously discharged without being cut off at each page;

cut-off control means for generating a cut-off signal on receipt by said network control means of a signal indicating that the reception of image data from said another facsimile apparatus has been completed for each page of said image data, when said cut-off mode has been set, and for generating a cut-off signal on receipt by said network control means of a signal indicating that the reception of all image data from said another facsimile apparatus has been completed when said continuous mode has been set; and cut-off means for cutting off the recording paper in response to said cut-off signal.

2. A facsimile apparatus according to claim 1, wherein said mode setting means comprises a single key, and further including remaining recording paper detection means for detecting the presence of remaining recording paper which has not been cut off by raid cut off means and on which received image data can be recorded;

said continuous mode being newly set when said single key is operated in a case where said cut-off mode has already been set;

said cut-off mode being newly set when said single key is operated in a case where said continuous mode has already been set and said paper detection means detects that no recording paper remains; and said cut-off signal being transmitted to said cut-off means to cut off the remaining recording paper when said single key is operated in a case where said continuous mode has already been set, reception of all of the image data has been completed, and said paper detection means detects that recording paper remains present.

3. A facsimile apparatus comprising:

cut-off mode selection means for selecting one of a first cut-off mode in which a recording paper on which received image data of a manuscript is recorded is cut off page by page and discharged, and a second cut-off mode in which the recording paper is cut off page by page and discharged or the recording paper in cut off after the completion of reception of the whole image data of the manuscript depending on the number of pages of the manuscript;

comparison means for comparing data indicative of the number of pages of the manuscript sent prior to transmission of image data with data indicative of a predetermined number of pages;

cut-off means for cutting off the recording paper on receipt of a signal indicating that transmission of image data for one page of the manuscript is completed and on receipt of a signal indicating that transmission of the whole image data of the manuscript is completed in a state where said first cut-off mode is selected and in a state where said second cut-off mode is selected and it is detected that the number of pages of the manuscript is more than said predetermined number of pages by said comparison means; and raid cut-off means for cutting off the recording paper only on receipt of a signal indicating that transmission of the whole image data is completed in a state where said second cut-off mode is selected and it is detected that the number of pages of the manuscript is smaller than said predetermined number of pages by said comparison means.

4. A facsimile apparatus comprising:

cut-off mode selection means for selecting one of a first cut-off mode in which a recording paper on which received image data of a manuscript is recorded is cut off page by page and discharged, and a second cut-off mode in which the recording paper is cut off page by page and discharged or the recording paper is cut off after the completion of reception of the whole image data of the manuscript depending on the number of pages of the manuscript;

comparison means for comparing data indicative of the number of pages of the manuscript sent prior to transmission of image data with data indicative of a predetermined number of pages;

cut-off means for cutting off the recording paper on receipt of a signal indicating that transmission of image data for one page of the manuscript is completed and on receipt of a signal indicating that transmission of the whole image data of the manuscript is completed in a state where said first cut-off mode is selected and in a state where said second cut-off mode is selected and it is detected that the number of pages of the manuscript is smaller than said predetermined number of pages of by said comparison means; and said cut-off means for cutting off the recording paper only on receipt of the signal indicating that transmission of the whole image data is completed in a state where said second cut-off mode is selected and it is detected that the number of pages of the manuscript is more than said predetermined number of pages by said comparison means.

* * * * *